US005531344A

United States Patent [19]

Winner

[11] Patent Number: 5,531,344

[45] Date of Patent: Jul. 2, 1996

[54] ACTUATOR FOR A PERSONAL PROTECTIVE SPRAY CANISTER

[75] Inventor: James E. Winner, Hollywood Beach, Fla.

[73] Assignee: Winner International Royalty Corporation, Sharon, Pa.

[21] Appl. No.: 337,753

[22] Filed: Nov. 14, 1994

[51] Int. Cl.$^{6}$ .......... G01F 11/00

[52] U.S. Cl. .......... 222/1; 222/402.1; 222/504; 222/649; 239/289; 340/574

[58] Field of Search .......... 222/1, 402.1, 504, 222/649; 239/62, 69, 70, 274, 289, 526; 109/29, 32; 340/574

[56] References Cited

U.S. PATENT DOCUMENTS

| | | | | |
|---|---|---|---|---|
| 3,584,766 | 6/1971 | Hart et al. | 222/504 | X |
| 3,627,176 | 12/1971 | Sailors | 222/504 | X |
| 3,772,687 | 11/1973 | Scott | 340/574 | X |
| 4,591,834 | 5/1986 | Sharp | 340/574 | |
| 4,611,198 | 9/1986 | Levinson et al. | 340/574 | X |
| 5,003,294 | 3/1991 | Mason et al. | 340/574 | |
| 5,034,730 | 7/1991 | Lin | 340/574 | X |
| 5,182,541 | 1/1993 | Bajorek et al. | 109/32 | X |
| 5,349,335 | 9/1994 | Lin | 340/574 | X |

FOREIGN PATENT DOCUMENTS

| | | | |
|---|---|---|---|
| 2019625 | 10/1979 | United Kingdom | 340/574 |

*Primary Examiner*—Andres Kashnikow
*Assistant Examiner*—Joseph A. Kaufman
*Attorney, Agent, or Firm*—Vickers, Daniels & Young

[57] ABSTRACT

An actuator for a personal protective spray canister having a container for holding a pressurized protective material capable of being propelled in a gaseous cloud to at least partially disable a person and a manipulative valving device protruding outwardly from the container, with the valving device having an outlet for directing the gaseous cloud from the container, and a valve element movable between a first biased normal position closing the outlet and a second depressed operative position opening the outlet to allow the material to be propelled from the container as a cloud. The actuator comprising: a radio frequency receiver for detecting and receiving a coded radio frequency signal, a decoder for creating an identification signal when the receiver receives a radio frequency signal with a preselected code, a mechanical device for moving the valve element into the second depressed, operative position in response to a danger signal, a circuit for creating a danger signal in response to a given number of identification signals, a power supply for providing power to operate the mechanical device to depress the valve element when the actuator is operatively associated with the valve element of the container.

31 Claims, 6 Drawing Sheets

FIG. 4
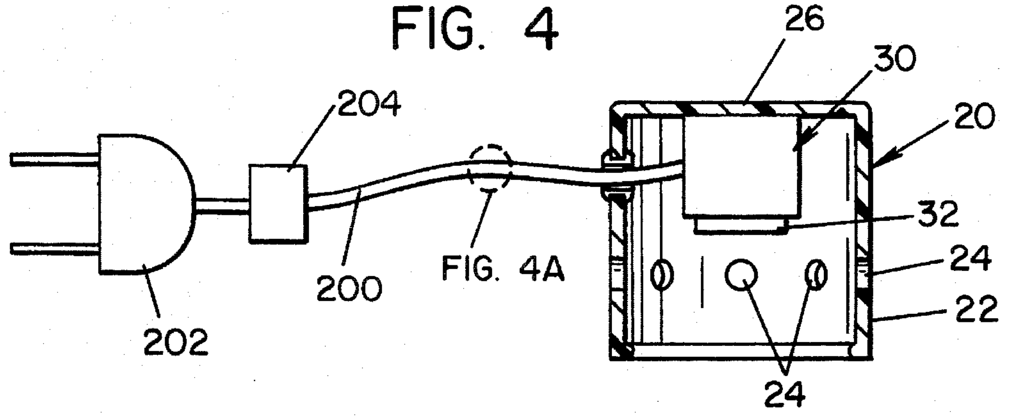
FIG. 4A
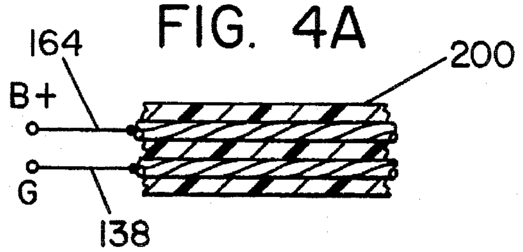
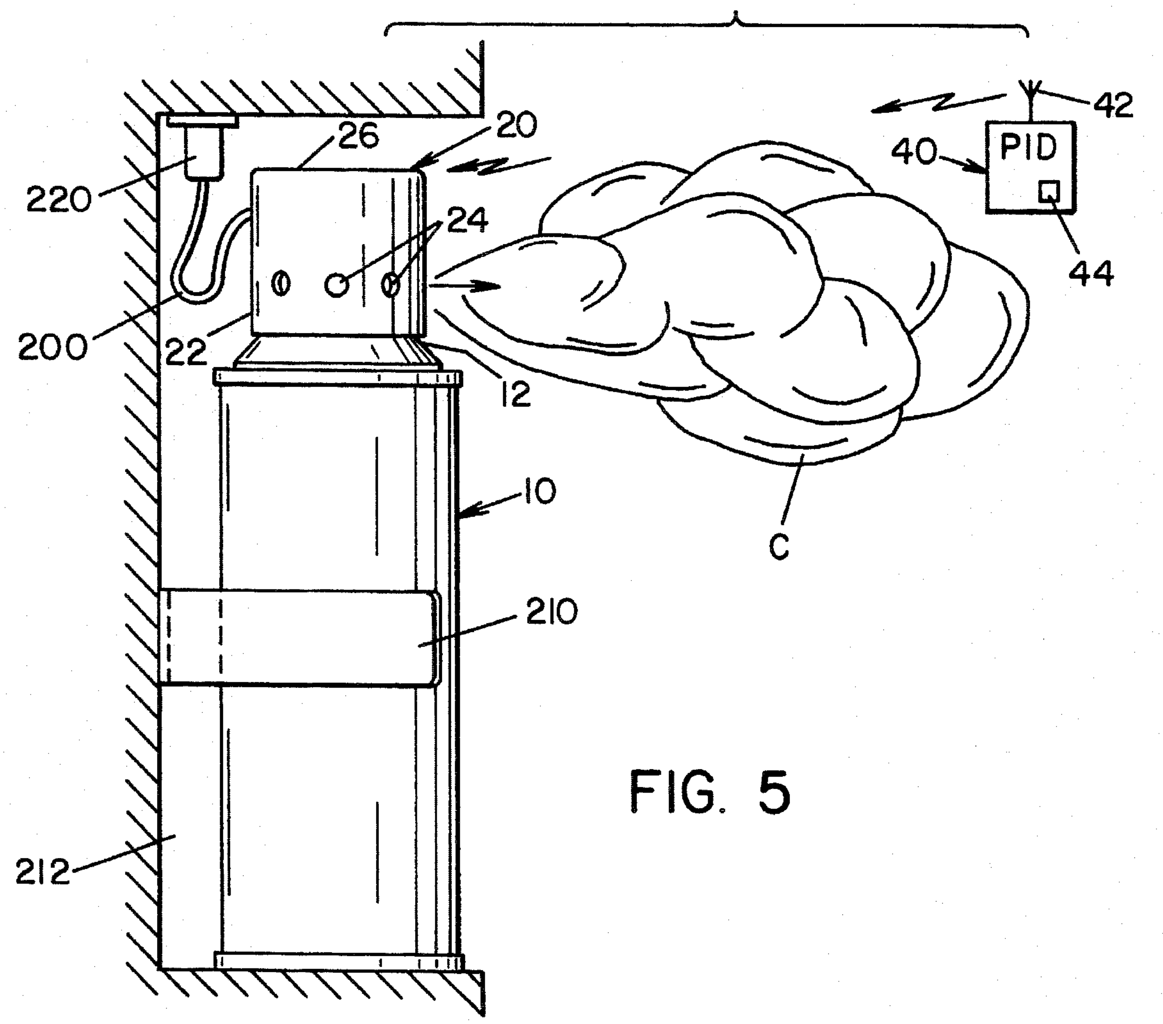
FIG. 5

ACTUATOR FOR A PERSONAL PROTECTIVE SPRAY CANISTER

This invention relates to the art of protective spray canister devices, such as a pepper base spray and mace, and more particularly to an actuator for a personal protective spray canister.

BACKGROUND OF INVENTION

It has become quite popular to use protective spray canisters of the type including a container with a pressurized protective material capable of being propelled in a gaseous cloud toward a threatening individual. The pressurized protective material can take a variety of forms, the most popular of which is a pepper based spray wherein a pressurized repellant carries, in a cloud, particulate material which debilitates an individual upon contact. Of course, other types of protective material, such as mace, are also employed in aerosol canister form. These canisters are normally carried in belt loops or purses and have a manipulative valving device protruding outwardly from the container so a person wanting to ward off imminent attackers can depress a valve element in the valving device to release a directional cloud of protective gaseous material. The valving element is biased upwardly into the closed position and is manually manipulated by depressing the valve element into a second position, which is the operative position for opening the outlet of the valving device, to allow the gaseous material to be propelled from the container toward the would-be attacker. Many of these personal protective spray canisters are now carried on persons for security purposes.

THE INVENTION

In the past, a disadvantage of the personal protective spray canister devices is that the user has only a very short time to actuate the protective spray or cloud before an attacker accomplished their sinister plan. In accordance with the present invention, the personal protective spray canister is operable from a remote location so the user may be a long distance from the canister when it is used to intercept and debilitate a would-be attacker or other criminal element to reduce the likelihood of personal injury by such criminal element. In accordance with the present invention, a standard canister is provided with a releasable cap having a cylindrical skirt for mounting the cap on the container over the valve element. A mechanical means carried by the cap itself is used to move the valve element into the second, or operative, position in response to a danger signal caused by a remotely created trigger signal having a preselected identification binary code and received by the cap. In a more limited detail, the mechanical means on the cap is a solenoid mounted on the end wall of the cap and having a plunger for moving the valve element into the second, operative position in response to the aforementioned danger signal. In accordance with a more detailed aspect of the present invention, the protective spray canister is provided with an actuator, including a radio frequency receiver means for detecting and receiving a coded radio frequency signal, a decoder means for creating an identification signal when the receiver means receives a radio frequency signal with a preselected code, mechanical means for moving the valve element into the second, depressed, operative position in response to a danger signal, means for creating a danger signal in response to a given number of identification signals, electrical means or power supply for providing electrical power to operate the mechanical means to depress the valve element and means for mounting the actuator onto the container with the mechanical means operatively associated with the valve element. In this detailed aspect of the device, the actuator is a releasable cap having a cylindrical skirt which is the mounting means for mounting the actuator onto the canister. The cap itself includes the electrical power supply which is a cadmium type battery mounted on the cap. In some instances, the cap or the actuator can be plugged into either the automobile battery power supply or a normal house current power supply. In any of these arrangements, the actuator receives a coded signal to operate a solenoid for forcing a plunger against the top of the valve element of a standard protective spray container to eject a protective spray or cloud while the operator is at a remote location.

The coded signal, in accordance with the present invention, is provided by a standard personal identification device (PID) which is often used for automotive security systems. Any one of a variety of personal identification devices can be used in practicing the invention. Such personal identification devices transmit radio frequency signals with binary codes that are unique to the owner of the personal identification device. By depressing a button on the PID the user has heretofore been able to turn on lights in his car, disable the security system, open trunks and perform various selected safety or security functions. Each personal identification device has a unique preselected binary code. This same code is programmed into the actuator constructed in accordance with the present invention for remote actuation of the protective spray canister.

In accordance with another aspect of the present invention, there is provided an electrical circuit for preventing inadvertent actuation of the canister from a remote location. This circuit can take a variety of forms. In the preferred embodiment, a selected number of coded signals must be received by the canister actuator in a very short time to actuate the canister. Each signal is indicative of a manual operation of the personal identification device held by the user. Consequently, the operating device must be manually pulsed rapidly to create the selected number of coded signals within a relatively short period of time. In practice, two depressions within less than two seconds are required for the purpose of causing the actuator to release the defensive spray or cloud. In accordance with another aspect of this invention, a manual switch can be used with the actuator to arm the actuator so a single coded signal can cause the protective spray or cloud only when the actuator is enabled by the manually operated switch. This switch could also be used as a means for enabling or disabling the actuator.

The actuator of the present invention is preferably a cap with a battery and the necessary circuitry. The cap is placed over a standard spray canister and operated by a standard personal identification device. The invention is more broad and could be used with an actuator mounted adjacent the entrance door of an apartment or other domestic dwelling. The actuator can be mounted in a vehicle. The actuator, in one form is separate from the canister. In the preferred form the actuator is a removable cap for the canister. The broadest aspect of the present invention is the mounting of an actuator device for remote operation of a protective spray canister, wherein the remote actuating device includes a transmitter for transmitting a coded signal which is unique to the particular actuator and to the particular user associated with the actuator.

The primary object of the present invention is the provision of an actuator for a protective spray canister of the type used for pepper spray, which actuator is operated from a remote location by a person identification device of the type creating a unique coded high frequency signal in response to manual manipulation of the personal identification device.

Yet another object of the present invention is the provision of a method for operating a protective spray canister, which method involves the step of moving the valve element in the canister into the propellant position in response to a danger signal created by a remotely created trigger signal having a preselected code.

Still a further object of the present invention is the provision of an actuator for a personal protective spray canister which actuator can be operated remotely so that the canister may be mounted at various positions, such as at the entrance door of an apartment or house, within a vehicle or at any other strategic, selected location to be secured.

Yet another object of the present invention is the provision of an actuator for a personal protected spray canister, as defined above, which actuator is self-contained in a cap to be placed over the canister.

These and other objects and advantages will become apparent from the following description using the drawings hereinafter described.

BRIEF DESCRIPTION OF THE DRAWINGS

FIG. 4 is a generally cross-sectional view of a modification of the preferred embodiment of the present invention where the actuator is powered by either the house power supply when the actuator is mounted adjacent an entrance door or the vehicle battery power supply when the actuator is mounted in a vehicle;

FIG. 4A is an enlarged partial view of the circled area in FIG. 4 showing the electrical power supply cord including a voltage positive line as well as a ground line;

FIG. 5 is a view similar to FIG. 1 illustrating the use of the modification as illustrated in FIG. 4 in a vehicle;

PREFERRED EMBODIMENTS

Figure 1:
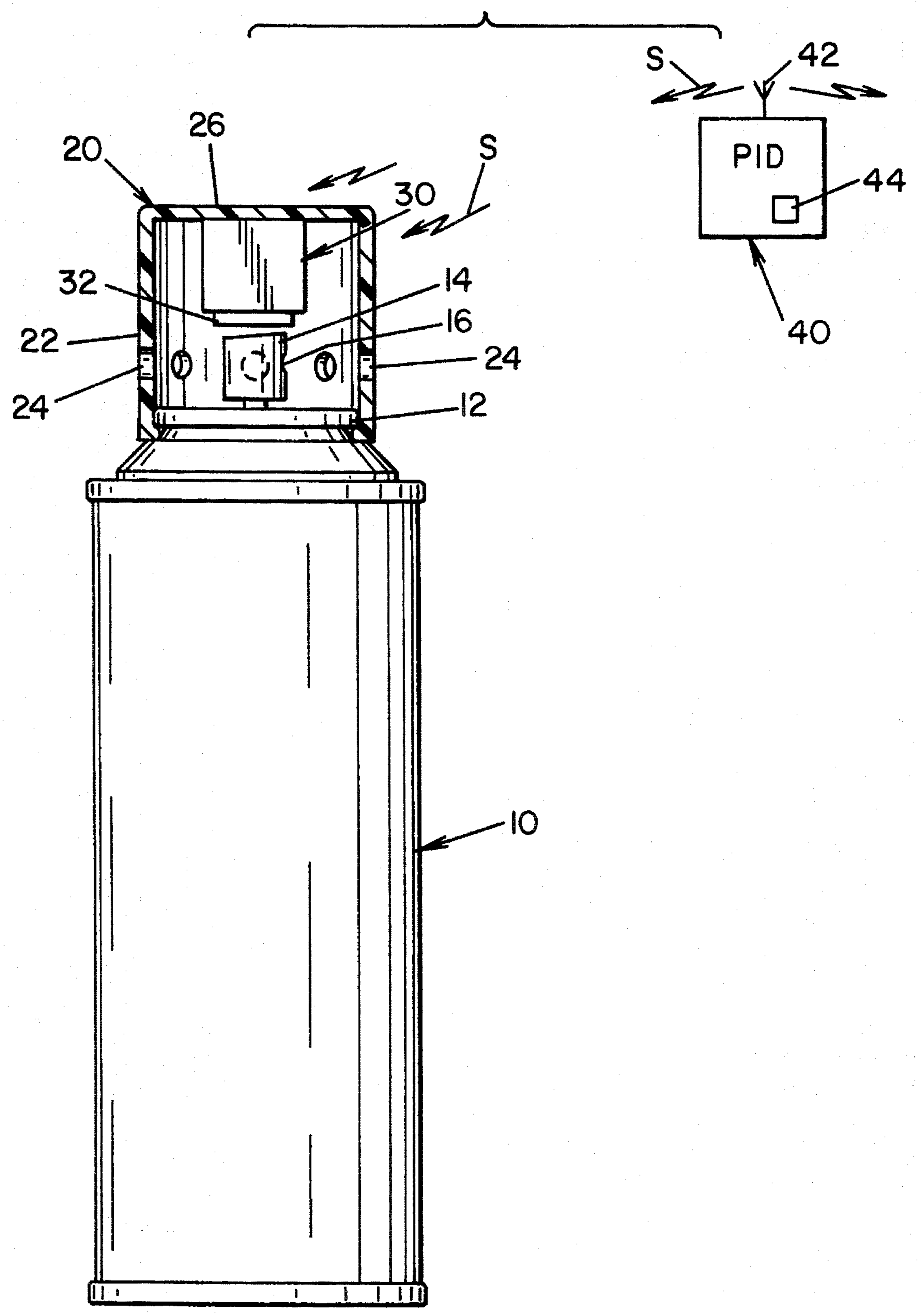
FIG. 1 is a side elevational view of the preferred embodiment of the present invention with the container cap actuator in cross section.
Figure 3:
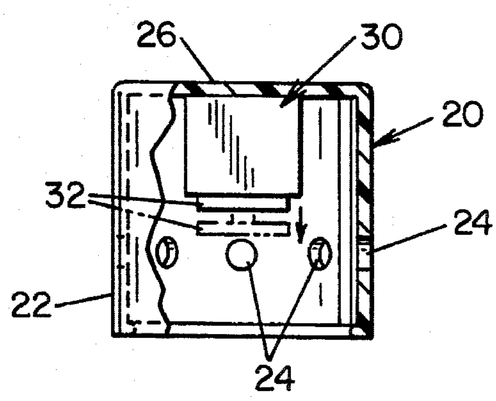
FIG. 3 is a cross section of the canister cap, shown in FIG. 1, illustrating the operation of the plunger for moving the valve element of the canister into the opened position.

Referring now to the drawings wherein the showings are for the purpose of illustrating the preferred embodiment of the invention, and not for purposes of limiting same, FIGS. 1 and 3 show a standard personal protective spray canister such as a pepper spray aerosol canister 10 having a top 12 with an outwardly extending valve element 14 having a gas projecting opening 16. In practice, valve element 14 is often located between two partitions so that only a finger can be employed in a very particular manner for operating valve element 14 and allowing projection of the cloud of gaseous material from opening 16, as shown in FIG. 5. For simplicity, the upper projected valving element is illustrated as merely an outwardly projecting device, such as used on a standard aerosol spray container to cause the projected spray. This valve element is used for simplicity and to better illustrate the present invention, which invention is not directed to any particular type of valving element, as long as the valving element is biased in the closed position and mechanically movable into the open position. As so far explained, canister 10 is standard and includes a container for holding a pressurized protective material capable of being propelled in a gaseous cloud to at least partially disable a person. This cloud can be mace, but is preferably a pepper based spray. Valving device 14 is manually manipulative and protrudes outwardly from the container. This valving element, or valve device, includes outlet 16 for directing the gaseous cloud from the container. The valving element, or device, is moved between a first biased, normal position closing outlet 16 and a second, depressed operative position opening outlet 16 to allow the gaseous material to be propelled from the container 10 as a directed cloud. In accordance with the present invention, cap 20 includes a cylindrical skirt 22 mounted over the top 12 of container 10 and having a plurality of circumferentially spaced openings 24. Cap 20 also includes an outer end wall 26 for mounting actuator mechanism 30 having a plunger 32, which is movable as illustrated in FIG. 3 between the solid line inactive position to the depressed active position, shown in phantom lines. The actuator is the cap or can be considered as being mounted on the cap. The cap is plastic and is provided with an appropriate antenna arrangement for receiving a high frequency digitally coded signal from a standard personal identification device 40. This PID device includes a transmitter 42 for transmitting radio frequency coded signal S from a remote position to cap 20 containing actuator mechanism 30. As so far described, an operator depresses button 44 of the personal identification device 40 in rapid succession to send a series of rapidly created binary coded signals S toward the actuator 30 of cap 20. Upon identification of signal S, the PID 40 is known to be the proper actuating device. Then actuator 30 causes plunger 32 to be driven downwardly as shown in FIG. 3. This propels a cloud of protective gas from canisters 10 from upwards of 50 to 100 feet. This is the normal range of a PID transmitting device now used for operating vehicle components from remote locations.

Figure 2:
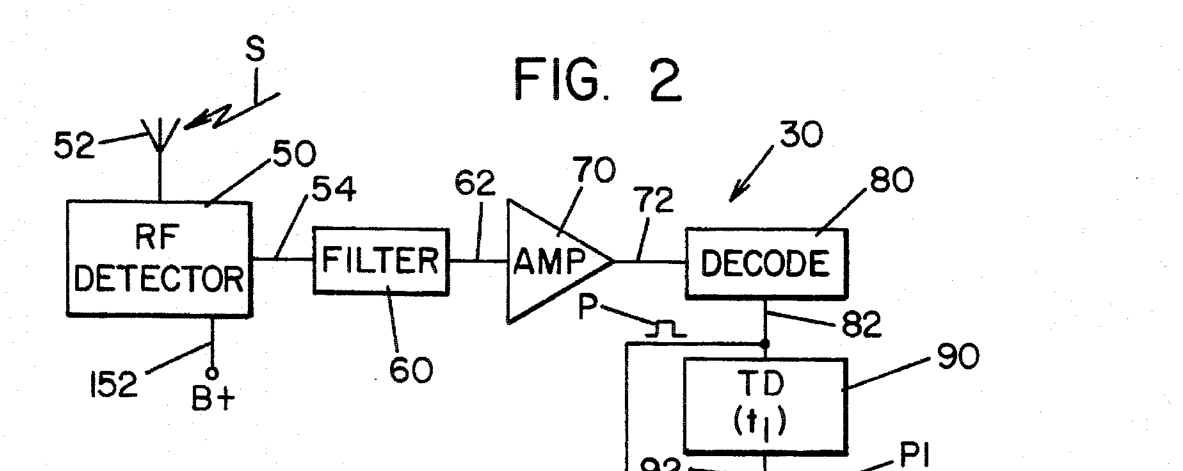
FIG. 2 is a block diagram showing the preferred embodiment of the electrical circuitry mounted in the cap of the preferred embodiment shown in FIG. 1.
Figure 2:
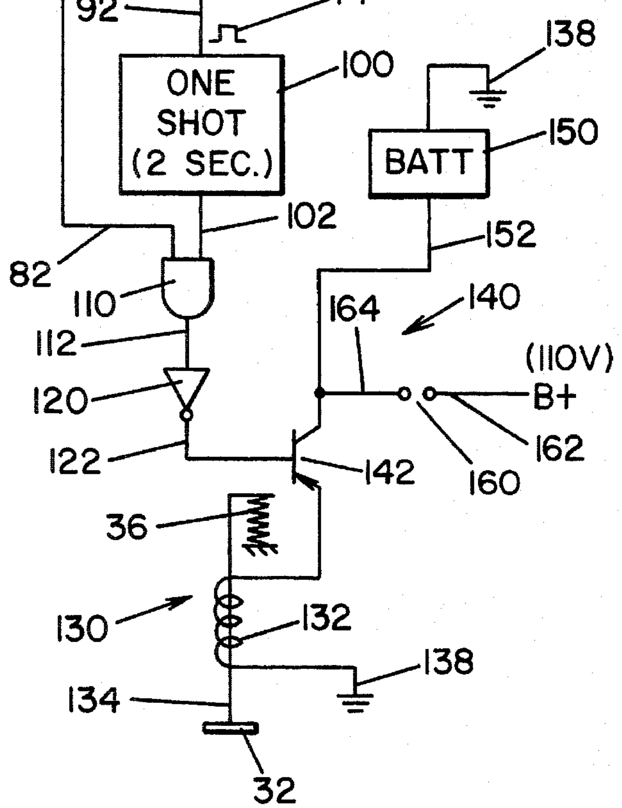

A variety of circuits could be incorporated for use with actuator 30; however, in the preferred embodiment illustrated in FIG. 2, actuator 30 includes a radio frequency detector 50 having an antenna 52 which is formed as a part of plastic cap 20. As is known, a very small antenna is required for receiving binary coded radio frequency trigger signals S. Output 54 of detector 50 directs all radio frequency signals to filter 60, which has a pass band tailored to the carrier frequency of PID 40. Output 62 of filter 60 directs the carrier signal to which filter 60 is tailored through amplifier 70 for producing a coded signal in line 72. The signal in line 72 will only be any carrier signal from a PID having the same frequency as PID 40. A standard binary decoder 50 is set, according to standard practice, to the unique binary code of the actual PID 40 of the person associated with canister 10. When decoder 80 receives a signal in line 72 which signal matches the preset binary code of decoder 80, a pulse P appears in output line 82. This pulse has a relatively short duration and is directed to the input of time delay device 90. This time delay device has a delay which is slightly greater than the time duration of pulse P. Consequently, pulse P disappears before time delay device 90 creates a signal in its output line 92. This signal in line 92 is another pulse labeled P1. Pulse P1 is relatively short in duration and initiates a one shot device 100 to hold a logic 1 in output line 102 for a preselected time. In the preferred embodiment this time is about 2.0 seconds. This timing is a matter of choice, but should be relatively short so that the actuation method requires a number of signals S created by PID 40 in succession. This actuation method assures that actuator 30 does not inadvertently discharge a cloud C. A signal is maintained in line 102 for 2.0 seconds. This line is one input of AND gate 110 having a second input for pulse P in line 82 and an output line 112 which creates a danger signal when gate 110 is enabled. A signal in line 112 indicates that canister 10 is to be discharged. By using time delay device 90, pulse P in line 82 will first appear as one input of gate 110; however, the other input 102 is not initiated by a particular pulse P. After pulse P has disappeared, one shot device 100 is then actuated. This occurs quite rapidly. Another signal P in line 82 then creates a danger signal in line 112. The circuitry illustrated creates a danger signal with two manual actuations of button 44 on PID 40 within two seconds. That is timing only illustrative. The same type of circuitry could be employed for counting several pulses in a relatively short period of time to create a danger signal in line 112. It is convenient to illustrate the concept of two identification signals within about 2.0 seconds to disclose the concept of preventing actuator 30 from malfunctioning because an inadvertent single operation of button 44.

To operate plunger 32 when there is a danger signal in line 112, the circuitry shown in FIG. 2 employs an inverter 120 having an inverted output 122 which shifts to a logic zero when there is a danger signal. This shift of logic on line 122 energizes solenoid 130 having a coil 132 for moving operating rod 134 connected to plunger 32, as previously described. Rod 134 is biased into the solid line position shown in FIG. 3 by spring 36. Coil 132 is grounded at line 138. Solenoid 130 is operated by control circuit 130 when line 122 is grounded. Circuit 140 includes a transistor 142 and power supply for the solenoid. The power supply is preferably a cadmium battery 150 located on cap 20. In the embodiments shown in FIGS. 4 and 5, actuator 30 is provided with a plug 160 for connecting power line 162 to output line 164, which line 164 is connected to the output line 152 of cadmium battery 150. Line 162 when connected to house current of 110 volts, is provided with a voltage reduction transformer and a rectifier so that the voltage applied at line 162 is approximately 9–12 volts dc. This voltage B+ on line 152 is employed for receiver 50, as well as filter 60, amplifier 70, decoder 80, time delay 90 and one shot device 100 in accordance with standard practice. In operation, a danger signal at line 122 causes transistor 142 to conduct. This energizes coil 132 of solenoid 130 for propelling plunger 32 downwardly as shown in phantom lines in FIG. 3.

Figure 2A:
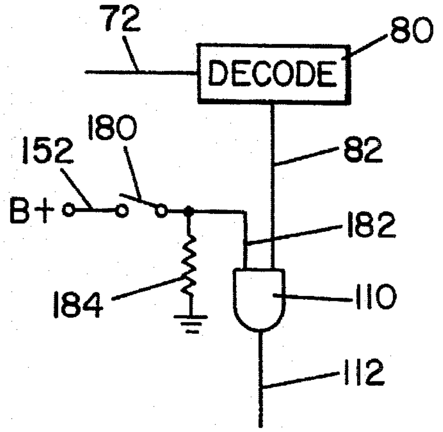
FIG. 2A is a partial circuit diagram showing a modification of the circuit illustrated in FIG. 2 for using a switch to enable the actuator of the present invention.

In FIG. 2A there is illustrated an option for the circuitry shown in FIG. 2. A manually manipulated switch 180 connects power supply line 152 with line 182 forming the second input to gate 110. In this manner, when switch 180 is opened, a logic 0 is applied through resistor 184 to line 182 of gate 110. By manually closing switch 180, gate 110 is energized. Whenever a signal appears on line 82 there is created a danger signal in line 112 as previously discussed. Switch 180 could be an enabling switch in any embodiment of the invention. In the particular embodiment illustrated in FIG. 2A, it is employed as the second enabling input for gate 110 so that a single pulse by the PID 40 will create a protective cloud of gaseous material in response to a danger signal in line 112. Thus, switch 180 is either a redundant enabling switch or is used to allow operation of actuator 30 with a single pulse at selected times.

Referring now to FIGS. 4 and 4A cord 200 contains power line 164 and ground line 138 as shown in FIG. 2. In FIG. 4 plug 202 is adapted for house current; therefore, a unified transformer and rectifier 204 is employed to create the 9-12 pulse dc on line 164. Plug 202 is referred to in FIG. 2 as plug 160; however, manually operated plug 160, in practice, includes a transformer and rectifier. FIG. 5 illustrates the invention mounted by spring clips 210 into opening 212 of a motor vehicle. Plug 220 for cord 200 is used to connect the battery line 162 with power line 164 in cord 200. When plugs 202 or 220 is employed, the battery 150 may be omitted from actuator 30. However, in practice, cadmium battery 150 is used as a backup and a redundant power supply when the present invention is mounted in a domicile or other protected building and connected with a plug 202 or used in a motor vehicle and connected with a plug 220. Cloud C is schematically illustrated in FIG. 5. Protective cloud C is directed from opening 16 in the various embodiments so far described.

Figure 6:
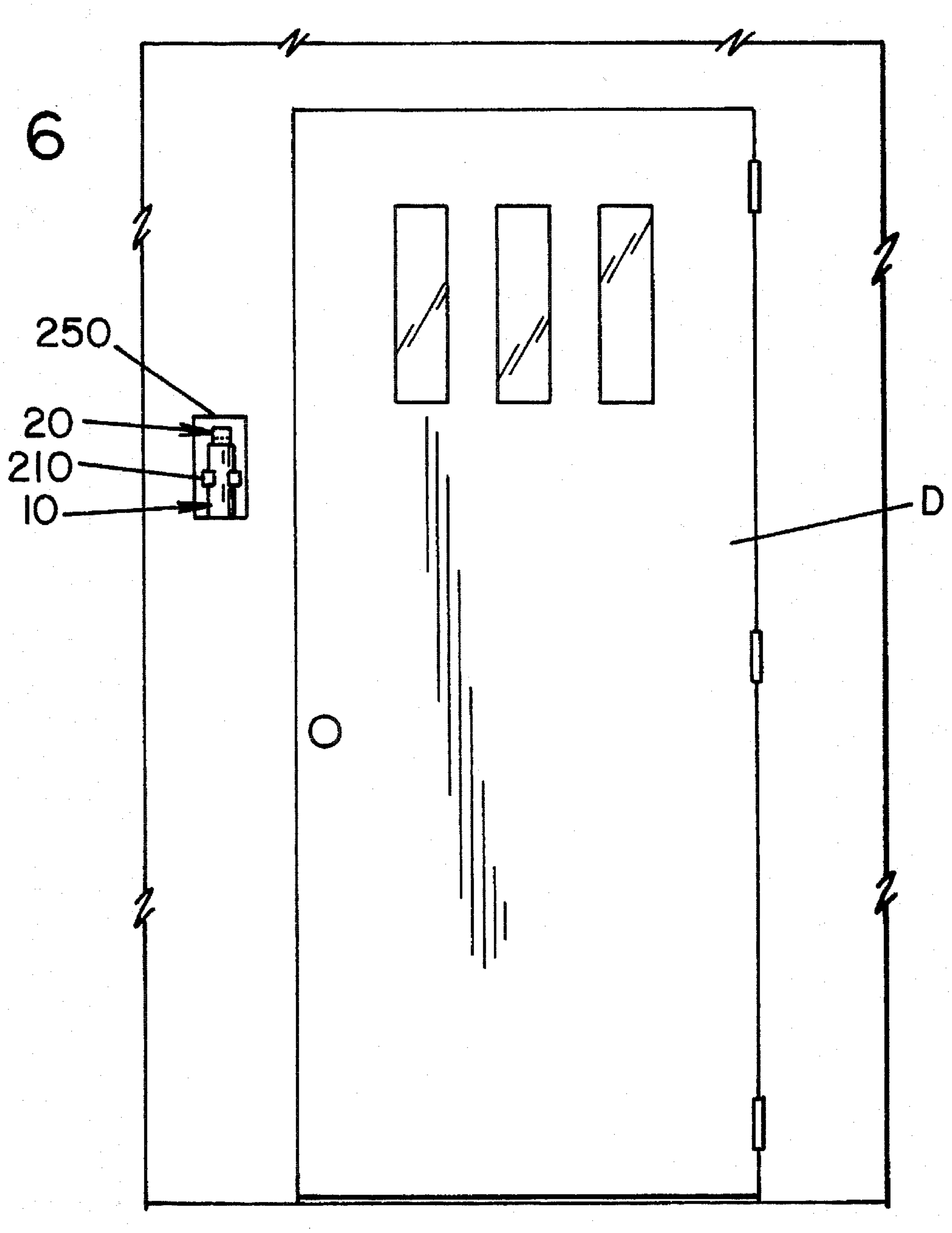
FIG. 6 is a front plan view of a domestic entrance door with the embodiment of the invention shown in FIG. 1 mounted adjacent the entrance door.
Figure 6A:
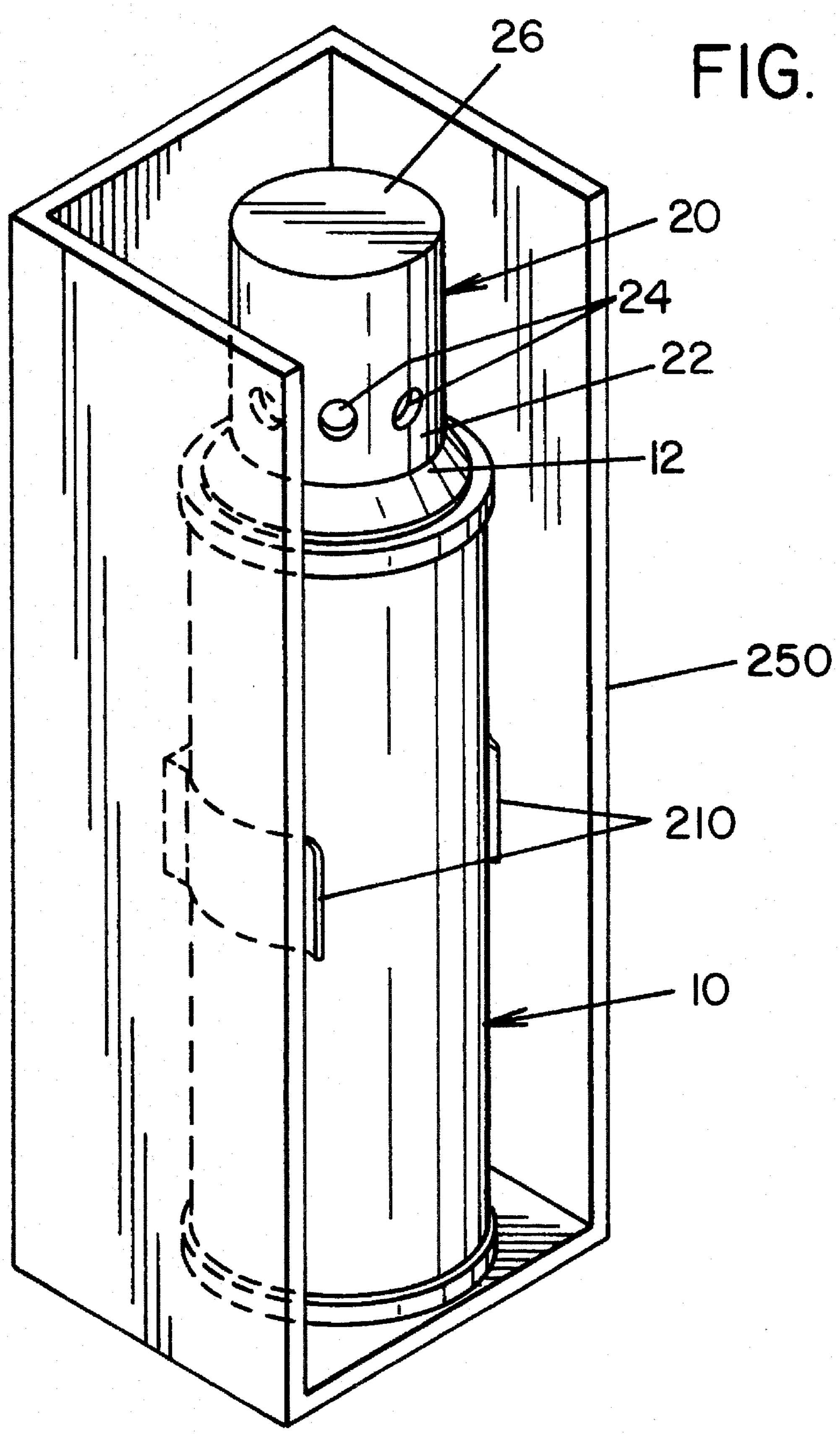
FIG. 6A is an enlarged pictorial view of the mounting arrangement for the preferred embodiment of the present invention in the use illustrated in FIG. 6; and, FIG. 7 is a side elevational view of a modification of the preferred embodiment of the present invention as best shown in FIG. 5, wherein a tubular element is employed for directing the protective cloud or spray of debilitating gaseous material.
Figure 7:
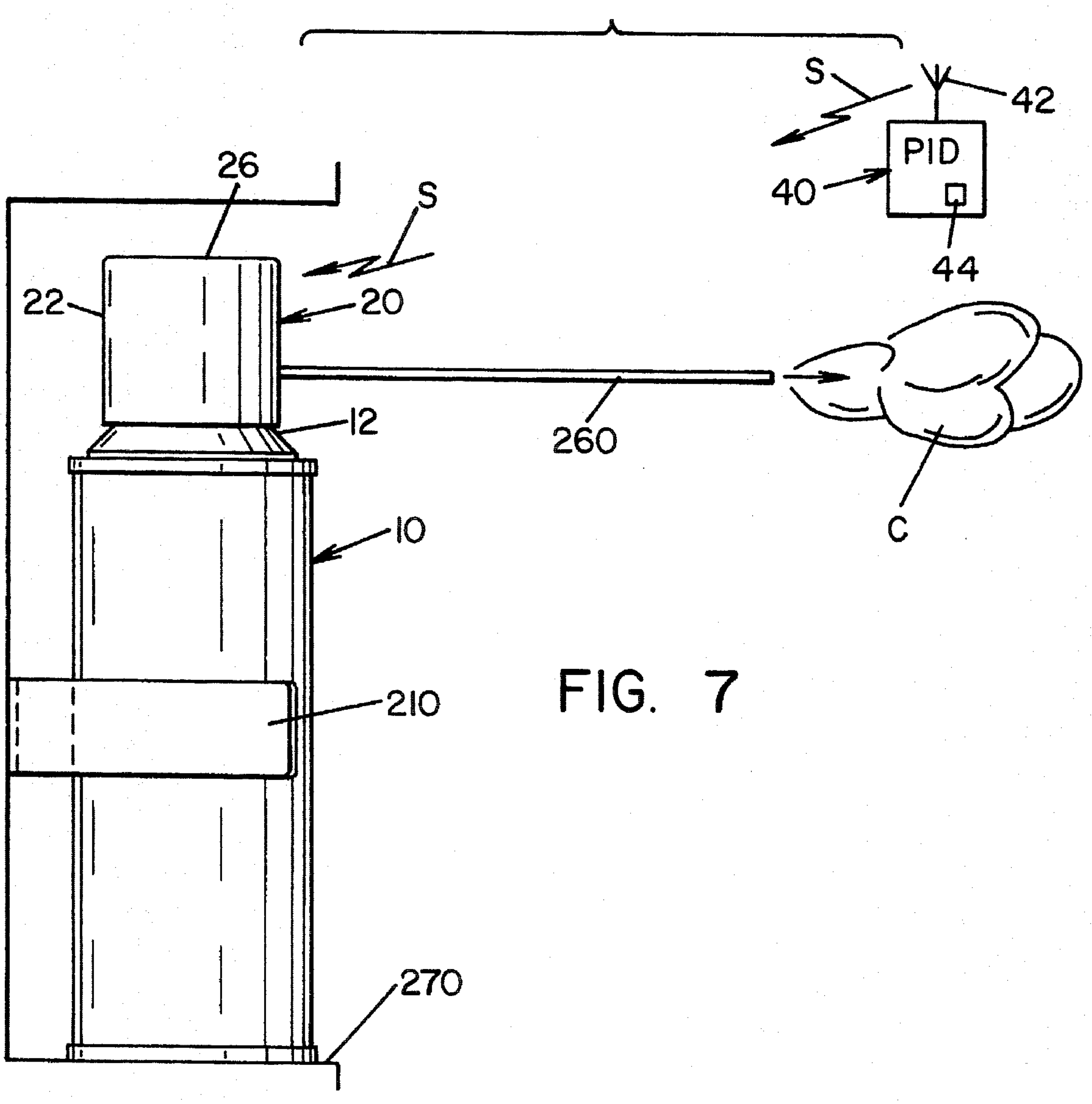

In FIGS. 6 and 6A, canister 10 is mounted adjacent entrance door D in a bracket or box 250. This box is secured to the wall adjacent door D, as shown in FIG. 6. This embodiment merely places a canister 10 in bracket or box 250 secured at door D. A person in another room activates canister 10 by depressing button 44 on PID 40, as previously described. FIG. 7 shows a slight modification of the invention wherein tube 260 is placed in opening 16 for directing cloud C to a particular area. Such tube is often employed in aerosol containers for directing the contents of a container to a particular remote location. Receptacle 270 is adjacent door D as shown in FIG. 6 or in a vehicle as shown in FIG. 5. Plugs 202, 220 can replace a cadmium battery 150, which is preferred in the invention. Although an electrical solenoid is shown, a mechanical trip mechanism could be activated by the proper code on signal S as a substitute for the electrical solenoid 32.

Having thus described the invention, the following is claimed:

1. An actuator for a personal protective spray canister having a container means for holding a pressurized protective material capable of being propelled in a gaseous cloud to at least partially disable a person and a manipulative valving device protruding outwardly from said container means, with said valving device having an outlet for directing said gaseous cloud from said container means and a valve element movable between a first biased normal position closing said outlet and a second depressed operative position opening said outlet to allow said material to be propelled from said container means as said cloud, said actuator comprising: a radio frequency receiver means for detecting and receiving a coded radio frequency signal, a decoder means for creating an identification signal when said receiver means receives a radio frequency signal with a preselected code, mechanical means for moving said valve element into said second depressed, operative position in response to a danger signal, means for creating said danger signal in response to a given number of identification signals received within a given time, electrical means for providing power to operate said mechanical means to depress said valve element and means for mounting said actuator onto said container with said mechanical means operatively associated with said valve element.

2. An actuator as defined in claim 1 including a releasable cap having a cylindrical skirt and forming said mounting means.

3. An actuator as defined in claim 2 wherein said cap has an end wall and means for mounting said mechanical means on said end wall.

4. An actuator as defined in claim 3 wherein said radio frequency receiver means includes an antenna as a part of said cap.

5. An actuator as defined in claim 2 wherein said electrical power means is a battery mounted on said cap.

6. An actuator as defined in claim 5 wherein said radio frequency receiver means includes an antenna as a part of said cap.

7. An actuator as defined in claim 5 where said given number is at least 2 and said given time is less than about 2.0 seconds.

8. An actuator as defined in claim 2 wherein said radio frequency receiver means includes an antenna as a part of said cap.

9. An actuator as defined in claim 8, where said given number is at least 2 and said given time is less than about 2.0 seconds.

10. An actuator as defined in claim 2 including means for counting identification signals and triggering said means for creating said danger signal when said counting means reaches said given number within a selected time.

11. An actuator as defined in claim 10 where said given number is at least 2 and said given time is less than about 2.0 seconds.

12. An actuator as defined in claim 10 including a releasable cap having a cylindrical skirt and forming said mounting means.

13. An actuator as defined in claim 12 wherein said given number is one and including means for selectively activating said danger signal creating means.

14. An actuator as defined in claim 2 where said given number is at least 2 and said given time is less than about 2.0 seconds.

15. An actuator as defined in claim 2 wherein said given number is one and including means for selectively preventing said identification signals from activating said danger signal creating means.

16. An actuator as defined in claim 15 wherein said selectively preventing means is a manually operated switch.

17. An actuator as defined in claim 2 wherein said given number is one and including means for selectively preventing said identification signals from activating said danger signal creating means.

18. An actuator as defined in claim 17 wherein said selectively preventing means is a manually operated switch on said cap.

19. An actuator as defined in claim 2 wherein said mechanical means is a plunger movable into an extended position upon creation of said danger signal.

20. An actuator as defined in claim 19 wherein said mechanical means includes a solenoid powered by said electrical means and energized in response to said danger signal.

21. An actuator as defined in claim 2 wherein said mechanical means is a plunger movable into an extended position upon creation of said danger signal.

22. An actuator as defined in claim 2 wherein said mechanical means includes a solenoid powered by said electrical means and energized in response to said danger signal.

23. An actuator as defined in claim 1 where said given number is at least 2 and said given time is less than about 2.0 seconds.

24. An actuator for a personal protective spray canister having a container means for holding a pressurized protective material capable of being propelled in a gaseous cloud to at least partially disable a person and a manipulative valving device protruding outwardly from said container means, with said valving device having an outlet for directing said gaseous cloud from said container means and a valve element movable between a first biased normal position closing said outlet and a second depressed operative position opening said outlet to allow said material to be propelled from said container means as said cloud, said actuator comprising: a releasable cap having a cylindrical skirt means for mounting on said container means over said valve element and mechanical means on said cap for moving said valve element into said second position in response to a danger signal created by a remotely created signal having a preselected code and received by said cap.

25. An actuator as defined in claim 26 wherein said code is a binary code.

26. An actuator as defined in claim 24 wherein said code is a part of an high frequency electromagnetic signal.

27. An actuator as defined in claim 24 wherein said mechanical means is a solenoid mounted in said cap and having a plunger for moving said valve element into said second position in response to said danger signal.

28. An actuator for a personal protective spray canister having a container means for holding a pressurized protective material capable of being propelled in a gaseous cloud to at least partially disable a person and a manipulative valving device protruding outwardly from said container means, with said valving device having an outlet for directing said gaseous cloud from said container means and a valve element movable between a first biased normal position closing said outlet and a second depressed operative position opening said outlet to allow said material to be propelled from said container means as said cloud, said actuator comprising:a cap including means for receiving a remotely created coded signal having a preselected code and mechanical means for moving said valve element into said second position in response to a danger signal created upon receipt of said remotely created coded signal.

29. An actuator as defined in claim 28 wherein said cap is cylindrical and includes means for mounting said receiving means and mechanical means on said cap and means for mounting said cap onto said container means.

30. A method of operating a personal protective spray canister having a container means for holding a pressurized protective material capable of being propelled in a gaseous cloud to at least partially disable a person and a manipulative valving device protruding outwardly from said container means, with said valving device having an outlet for directing said gaseous cloud from said container means and a valve element movable between a first biased normal position closing said outlet and a second depressed operative position opening said outlet to allow said material to be propelled from said container means as said cloud, and a cap mounted on said container means, said method comprising the steps of providing mechanical means in said cap for moving said valve element into said second position and moving said valve element into said second position in response to a danger signal created by a remotely created trigger signal having a preselected code.

31. A method as defined in claim 30 including the further step of creating said trigger signal as a radio frequency carrier with said preselected code being a binary code transmitted by said carrier.

* * * * *